US012565150B2

(12) United States Patent
Kim et al.

(10) Patent No.: US 12,565,150 B2
(45) Date of Patent: Mar. 3, 2026

(54) COVER APPARATUS FOR A VEHICLE CARGO SPACE

(71) Applicants:HYUNDAI MOTOR COMPANY, Seoul (KR); KIA CORPORATION, Seoul (KR)

(72) Inventors: Min Su Kim, Hwaseong-si (KR); Jae Eun Chang, Gwangmyeong-si (KR); Kyu Hee Kim, Suwon-si (KR); Suk Won Hong, Bucheon-si (KR); Tae Sung Mun, Suwon-si (KR); Tae Oh Moon, Incheon (KR); Kang Ho Joo, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 380 days.

(21) Appl. No.: 18/388,090

(22) Filed: Nov. 8, 2023

(65) Prior Publication Data

US 2024/0399965 A1 Dec. 5, 2024

(30) Foreign Application Priority Data

Jun. 2, 2023 (KR) ......................... 10-2023-0071238

(51) Int. Cl.
B60R 5/00 (2006.01)
B60R 5/04 (2006.01)

(52) U.S. Cl.
CPC .................................... B60R 5/045 (2013.01)

(58) Field of Classification Search
CPC ........... B60R 5/006; B60R 5/04; B60R 5/044; B60R 5/045; B60R 5/048

USPC ....................................................... 296/37.16
See application file for complete search history.

(56) References Cited

U.S. PATENT DOCUMENTS

| | | | | | |
|---|---|---|---|---|---|
| 5,211,718 | A | * | 5/1993 | Gotz ........................ | B60J 7/223 |
| | | | | | 296/180.1 |
| 7,488,024 | B1 | * | 2/2009 | Medlar ..................... | B60R 5/04 |
| | | | | | 296/37.16 |
| 2009/0058128 | A1 | * | 3/2009 | Hirayama ............... | B60R 5/047 |
| | | | | | 296/136.03 |
| 2011/0241372 | A1 | * | 10/2011 | Kusu ...................... | B60R 5/048 |
| | | | | | 296/37.16 |

(Continued)

FOREIGN PATENT DOCUMENTS

| | | |
|---|---|---|
| CN | 107985207 A | 5/2018 |
| JP | H10166915 A | 6/1998 |
| JP | H11245731 A | 9/1999 |

(Continued)

*Primary Examiner* — Steven O Douglas
(74) *Attorney, Agent, or Firm* — Lempia Summerfield Katz LLC

(57) ABSTRACT

A cover apparatus for a vehicle includes a main body part configured to shield a luggage space of the vehicle and connected to a tailgate and includes a pair of side hinge parts coupled to the main body part and, as the tailgate is opened, guiding the main body part to rotate in a direction in which the main body part and the tailgate are opened together by being interlocked with each other. The cover apparatus includes a screen part mounted on the pair of side hinge parts and configured to be selectively drawn out to hook on a rear seat. An elastic force acts on the screen part in a direction to be drawn out. The elastic force is provided by the pair of side hinge parts.

16 Claims, 10 Drawing Sheets

(56) References Cited

U.S. PATENT DOCUMENTS

| | | | |
|---|---|---|---|
| 2018/0319344 A1 | 11/2018 | Fleischhacker | |
| 2020/0369213 A1 | 11/2020 | Sjöstedt et al. | |

FOREIGN PATENT DOCUMENTS

| | | | |
|---|---|---|---|
| KR | 200458095 Y1 | 1/2012 | |
| KR | 20180052352 A | 5/2018 | |
| KR | 20220055245 A | 5/2022 | |
| KR | 20230033317 A | 3/2023 | |

* cited by examiner

COVER APPARATUS FOR A VEHICLE CARGO SPACE

CROSS REFERENCE TO RELATED APPLICATION

The present application claims priority to Korean Patent Application No. 10-2023-0071238, filed Jun. 2, 2023, the entire contents of which are incorporated herein for all purposes by this reference.

BACKGROUND

Field of the Disclosure

The present disclosure relates to a cover apparatus for a vehicle cargo space. More particularly, the present disclosure relates to a cover or shelf apparatus for a vehicle cargo space that provides a function such that a shelf and a tailgate are opened by being interlocked with each other and at the same time provides a function of covering a space between a rear seat and a tailgate.

Description of the Related Art

In general, a hatchback-type vehicle such as a sport utility vehicle (SUV), a compact utility vehicle (CUV), or the like, does not have a separate luggage area or trunk space. Instead, a space between a rear seat and a tailgate is used as a luggage area or cargo space. Thus, a cover or shelf for shielding a space between a passenger cabin and the luggage space is provided between a rear seat and a tailgate.

A typical cover or shelf is connected to a tailgate of a vehicle by a pair of wires (cables) so that it is automatically opened and closed by being interlocked with the tailgate and opens and closes with the tailgate. For example, a front end of the cover is hinged to a luggage side trim and a rear end of the cover is connected to the tailgate by the medium of the wires.

In other words, when the tailgate is opened, the rear end of the cover is lifted upward around the rotating shaft positioned at the front end thereof. As a result, the cover is opened together with the tailgate.

On the other hand, when the cover having such a structure is applied to a vehicle in which a rear seat is able to be slid and reclined, an excessive amount of empty space is inevitably created due to a gap between the cover and the rear seat.

In other words, sliding and reclining of the rear seat may be applied to a small hatchback-type vehicle (SUV, CUV, or the like). As the rear seat slides and reclines, an empty space is created due to the gap between the cover and the rear seat. This results in a problem in that the concealment function for the luggage is unable to be provided.

The foregoing is intended merely to aid in understanding the background of the present disclosure. The foregoing is not intended to mean that the present disclosure falls within the purview of the related art that is already known to those having ordinary skill in the art.

SUMMARY

Accordingly, the present disclosure has been made keeping in mind the above problems occurring in the related art. The present disclosure is intended to provide a cover apparatus for a vehicle cargo space. The apparatus provides a function of being opened by being interlocked with a tailgate along with a function of a shelf. The apparatus also provides a screen that is selectively drawn out by elasticity as a rear seat slides and reclines and allows covering of a space between a cover body and the rear seat to be accomplished. Accordingly, the apparatus is able to prevent foreign substances from entering the luggage area or cargo space and to provide a function of concealing luggage loaded in a luggage area or cargo space.

In order to achieve the above objectives, according to the present disclosure, a cover apparatus for a vehicle cargo space is provided. The apparatus includes a main body part that is provided to shield a luggage space of the vehicle and that is connected to a tailgate. The apparatus also includes a pair of side hinge parts coupled to the main body part and, as the tailgate is opened, guide the main body part to rotate in a direction in which the main body part and the tailgate are opened together by being interlocked with each other. The apparatus also includes a screen part mounted on the pair of side hinge parts and provided to be selectively drawn out and to be hooked on a rear seat. The screen part is also provided so that an elastic force acts thereon in a direction to be drawn out. The elastic force is provided by the pair of side hinge parts.

The pair of side hinge parts are coupled to mounting holes of side trims provided in the luggage space, respectively. Thus, the main body part may be rotatably mounted in the luggage space.

Such a main body part is detachable from the luggage space together with the pair of side hinge parts and the screen part.

In addition, each side hinge part of the pair of side hinge parts may include a hinge bracket mounted on a corresponding one of opposite sides of the main body part and rotatably coupled to the luggage space. Each side hinge part may also include a case member positioned inside the hinge bracket and a side pin rotatably coupled to the case member. The side pin may extend toward the screen part and may be configured to rotate together with the screen part as the screen part is drawn out. Each side hinge part may also include an elastic member coupled to the side pin by being fixedly disposed inside the case member and provided so that an elastic force acts thereon as the side pin rotates.

In addition, the case member may be provided with a locking protrusion that protrudes toward an upper portion of the hinge bracket so that rotation thereof in a direction in which the side pin rotates is restricted.

In addition, the hinge bracket may be provided with a coupling area A where the case member is positioned. The coupling area A may be provided with a plurality of protruding members that protrude from a top portion, a bottom portion, and an inside portion thereof and in contact with the case member.

Each of the protruding members may be provided such that an outer surface in contact with the case member is rounded.

In addition, the elastic member may be provided in a spiral structure. One portion of the spiral structure positioned in a center thereof may be fixed to the side pin, and an opposite portion may be fixed to an inner circumferential surface of the case member.

In addition, the side pin may include a side holder inserted into a coupling hole provided in the screen part in an axial direction and coupled to the screen part. The side pin may also include a pin member provided to rotate together with the side holder as the side holder is rotated by the screen part.

In addition, the screen part may include a mounting member provided to have a length extending along a width direction of the main body part and coupled to the pair of side hinge parts. The screen part may also include a screen member provided to be selectively drawn out while rotating the mounting member. The screen part may also include a hooking member coupled to the screen member and provided with a plurality of hooks to be hooked on the rear seat.

In addition, the screen part may include divided sections that correspond to a divided structure of the rear seat. Each divided section of the screen part may be provided to be independently drawn out.

On the other hand, the apparatus may further include a cover part provided to cover a mounting area of the main body part. The mounting area may be mounted with the screen part including the pair of side hinge parts thereon.

Such a cover part may include a pair of coupling members respectively coupled to a pair of support brackets, which are respectively provided with through holes through which opposite sides of the screen part pass, respectively, and with mounting guides protruding along a direction facing each other. The cover part may also include an upper cover rotatably provided with the mounting guides as rotating shafts, as the mounting guides and the coupling members are respectively coupled to each other.

Each of the mounting guides may be provided with a spring on an outer circumferential surface thereof. The spring may be inserted into one of the coupling members, wherein the spring is provided to allow an elastic force to act on the upper cover in a direction toward the screen part.

As described above, the present disclosure provides a cover apparatus for a vehicle cargo space. The apparatus provides a function of being interlocked with a tailgate so as to open with the tailgate along with a function of a shelf. At the same time, the apparatus is provided with a screen that is selectively drawn out by elasticity as a rear seat slides and reclines and allows covering of a space between a main body part of the cover and the rear seat to be accomplished. Accordingly, the present disclosure has an effect in that the apparatus is able to prevent foreign substances from entering the luggage space and to provide a function of concealing luggage loaded in a luggage space.

In addition, the present disclosure mounts an upper cover for shielding the screen assembly. An end portion of the upper cover is allowed to be elastically supported in a downward direction, effectively always shielding a screen assembly through the upper cover regardless of a direction in which the screen is drawn out due to the sliding and reclining of the rear seat.

BRIEF DESCRIPTION OF THE DRAWINGS

The above and other objectives, features, and other advantages of the present disclosure should be more clearly understood from the following detailed description when taken in conjunction with the accompanying drawings, in which.

DETAILED DESCRIPTION

Hereinafter, embodiments according to the present disclosure are described in detail with reference to the accompanying drawings.

Advantages and features of the present disclosure and a method of achieving the same should become clear with reference to the embodiments described below in detail in conjunction with the accompanying drawings.

However, the present disclosure is not limited by the embodiments disclosed below and may be implemented in a variety of different forms. These embodiments are only provided to make the disclosure of the technical concept complete. Furthermore, these embodiments are provided to fully inform those having ordinary skill in the art of the scope of the disclosure to which the present disclosure pertains. The present disclosure is only defined by the scope of the claims.

In addition, in the description of the present disclosure, when it is determined that related known technologies may obfuscate the gist of the present disclosure, a detailed description thereof is omitted. When a component, device, element, or the like of the present disclosure is described as having a purpose or performing an operation, function, or the like, the component, device, or element should be considered herein as being "configured to" meet that purpose or perform that operation or function.

Figure 1:
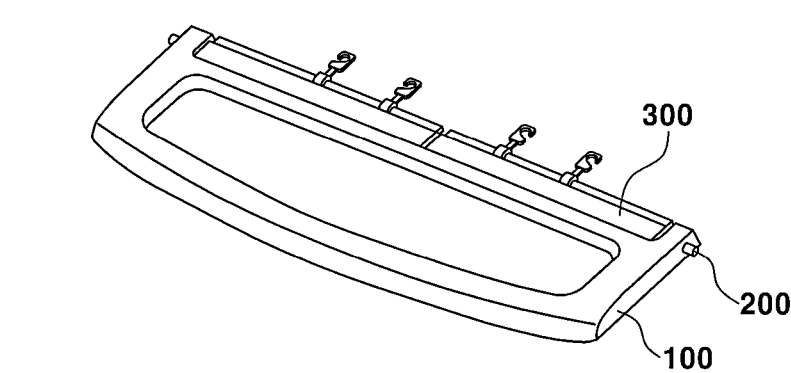
FIG. 1 is a view showing a cover for a luggage area or cargo space of a vehicle according to an embodiment of the present disclosure.
Figure 2:
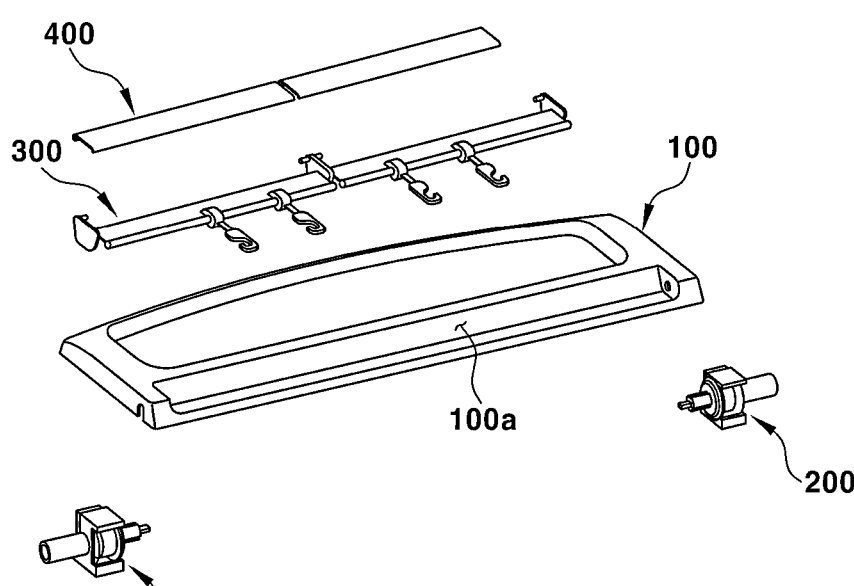
FIG. 2 is an exploded view of the cover for a vehicle according to the embodiment of the present disclosure.
Figure 3:
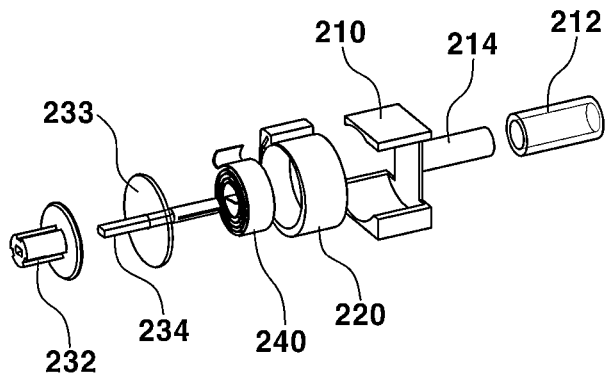
FIG. 3 is an exploded view of a side hinge for the cover for a vehicle according to the embodiment of the present disclosure.

FIG. 1 is a view showing a cover for a vehicle luggage area or cargo space, i.e., luggage space, according to an embodiment of the present disclosure. FIG. 2 is an exploded view of the cover for a vehicle according to the embodiment of the present disclosure. FIG. 3 is an exploded view of a side hinge for the cover for a vehicle according to the embodiment of the present disclosure.

Figure 4:
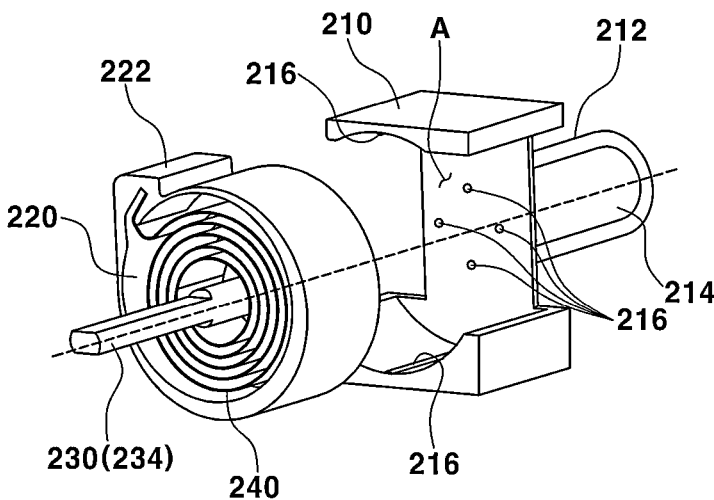
FIG. 4 is a view showing a coupling between a hinge bracket and a case member for the cover for a vehicle according to the embodiment of the present disclosure.
Figure 5:
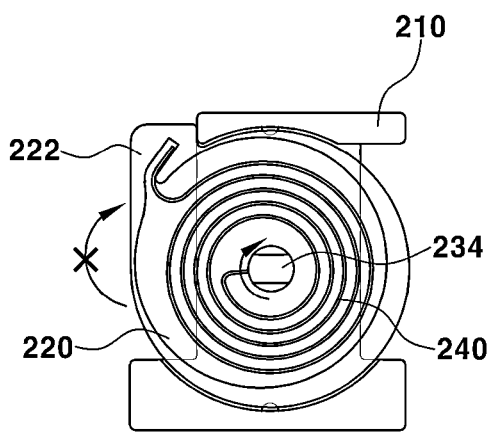
FIG. 5 is a view showing a hooked state of the case member for the cover for a vehicle according to the embodiment of the present disclosure.
Figure 6:
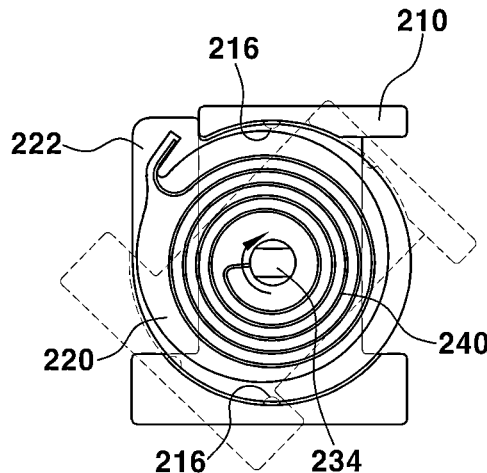
FIG. 6 is a view showing rotation of a case member for the cover for a vehicle according to the embodiment of the present disclosure.

In addition, FIG. 4 is a view showing a coupling between a hinge bracket and a case member for the cover for a vehicle according to the embodiment of the present disclosure. FIG. 5 is a view showing a hooked state of the case member for the cover for a vehicle according to the embodiment of the present disclosure. FIG. 6 is a view showing the rotation of a case member for the cover for a vehicle according to the embodiment of the present disclosure.

Figure 7:
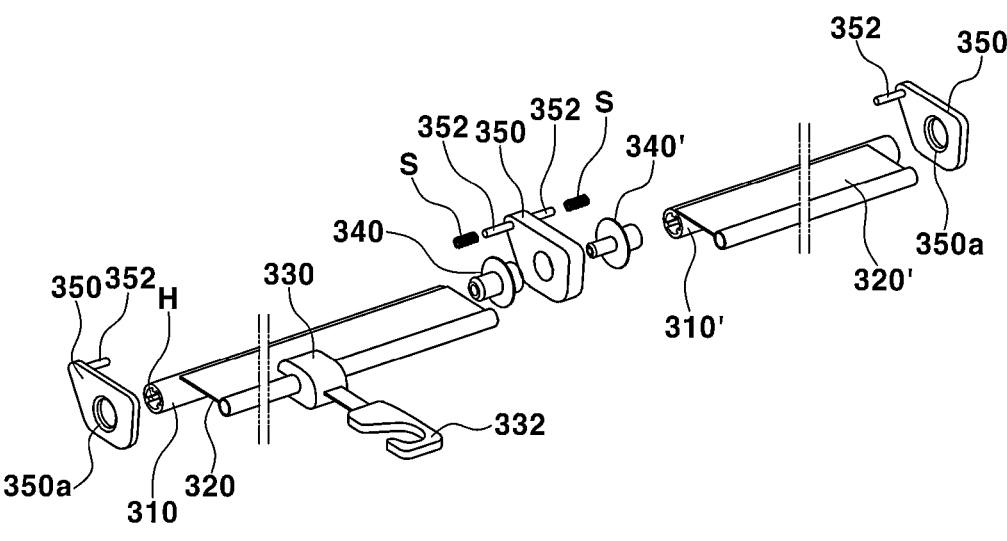
FIG. 7 is an exploded view of the screen part for the cover for a vehicle according to the embodiment of the present disclosure.
Figure 8:
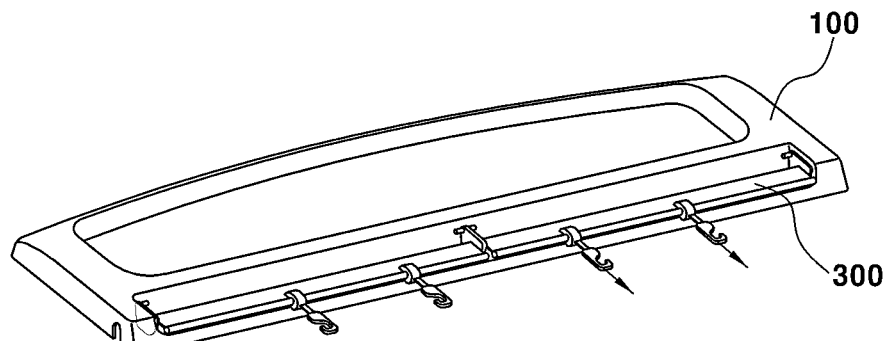
FIGS. 8 and 9 are views each showing the withdrawal of the screen part for the cover for a vehicle according to the embodiment of the present disclosure.
Figure 9:
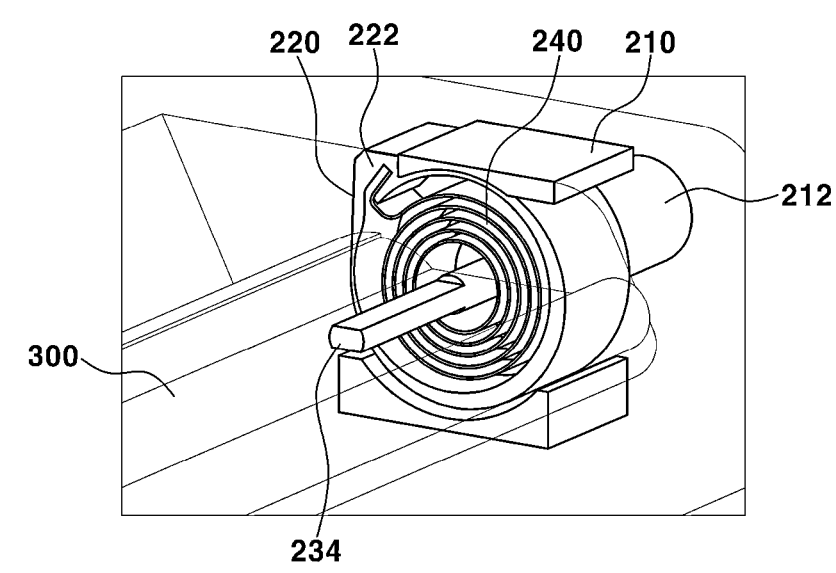
Figure 10:
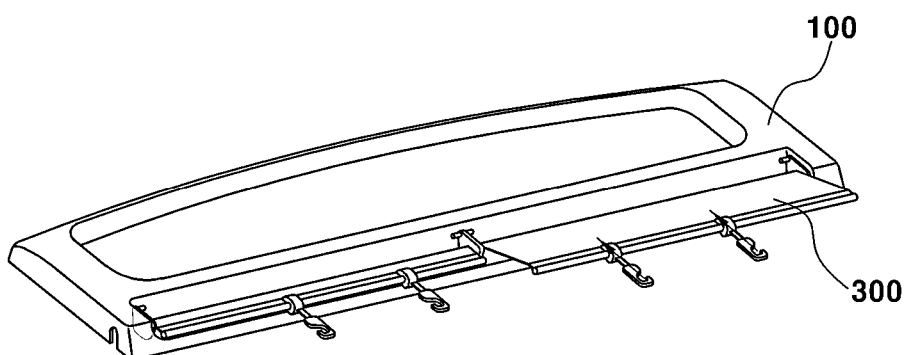
FIGS. 10 and 11 are views each showing a return to an original state of the screen part for the cover for a vehicle according to the embodiment of the present disclosure.
Figure 11:
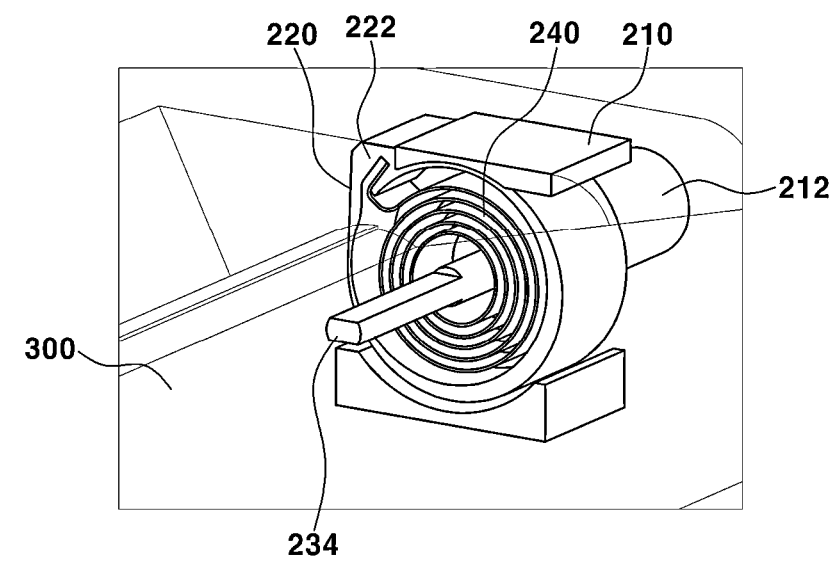

In addition, FIG. 7 is an exploded view of the screen part for the cover for a vehicle according to the embodiment of the present disclosure. FIGS. 8 and 9 are views each showing the withdrawal of the screen part for the cover for a vehicle according to the embodiment of the present disclosure. FIGS. 10 and 11 are views each showing a return to an original state of the screen part for the cover for a vehicle according to the embodiment of the present disclosure.

Figure 12:
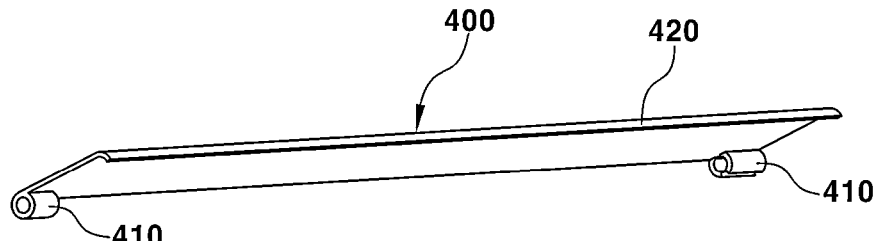
FIG. 12 is a view showing a cover part for the cover for a vehicle according to the embodiment of the present disclosure.
Figure 13A:
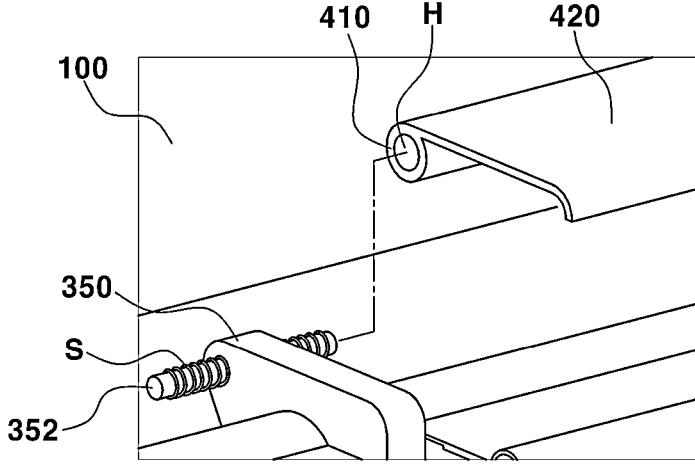
FIGS. 13A and 13B are views showing mounting of a cover part for the cover for a vehicle according to the embodiment of the present disclosure.
Figure 13B:
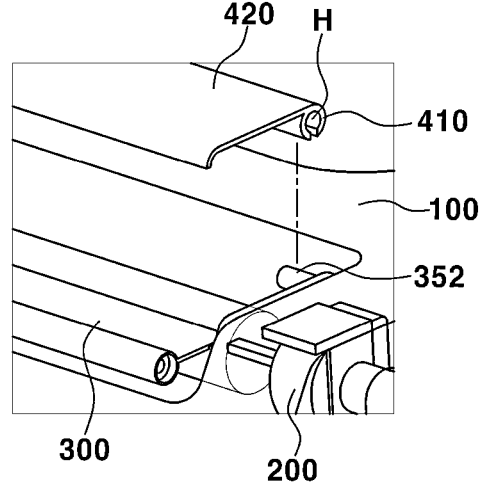

In addition, FIG. 12 is a view showing a cover part for the cover for a vehicle according to the embodiment of the present disclosure. FIGS. 13A and 13B are views each showing mounting of a cover part for the cover for a vehicle according to the embodiment of the present disclosure.

Figure 14A:
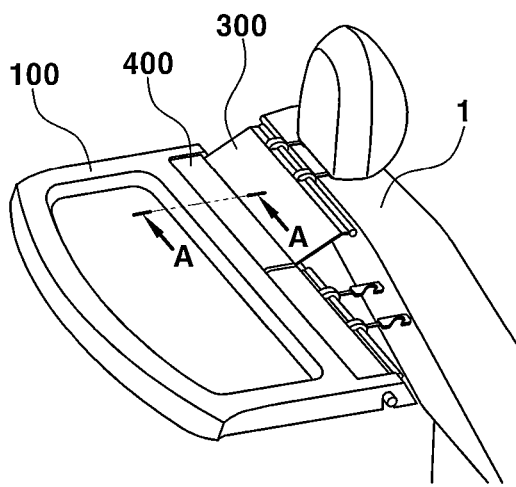
FIGS. 14A and 14B are views showing a state in which the screen part for the cover for a vehicle according to the embodiment of the present disclosure is mounted and hooked.
Figure 14B:
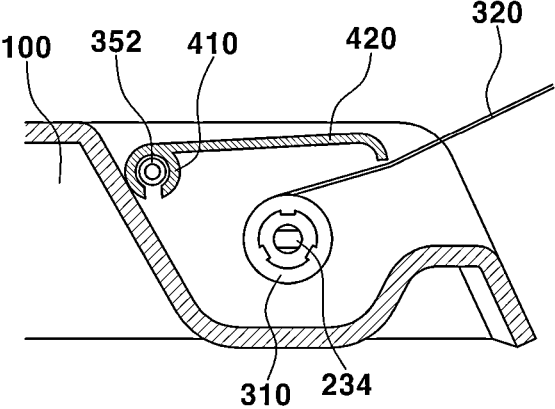
Figure 15A:
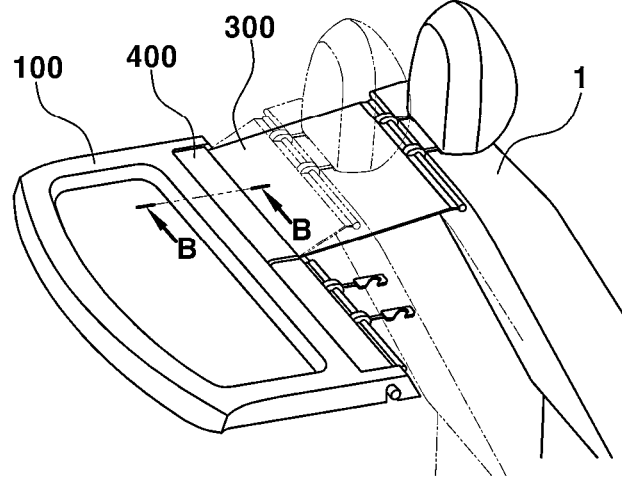
FIGS. 15A and 15B are views showing the withdrawal of the screen part for the cover for a vehicle according to the embodiment of the present disclosure when the rear seat moves forward.
Figure 15B:
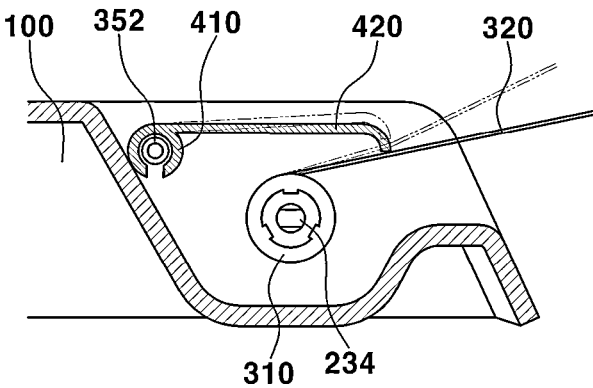
Figure 16A:
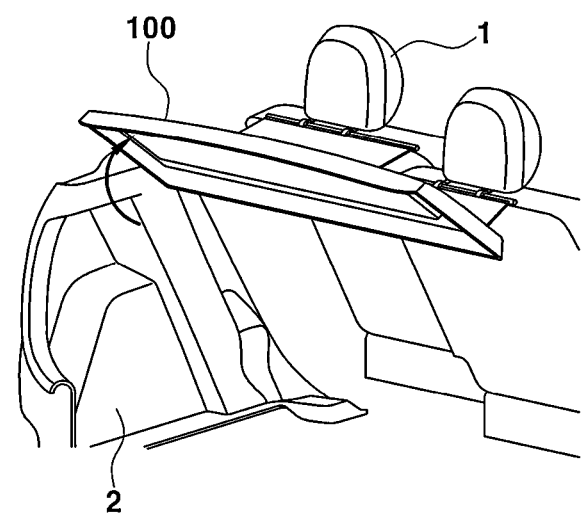
FIGS. 16A and 16B are views showing a cover part when a main body part for the cover for a vehicle according to the embodiment of the present disclosure is rotated.
Figure 16B:
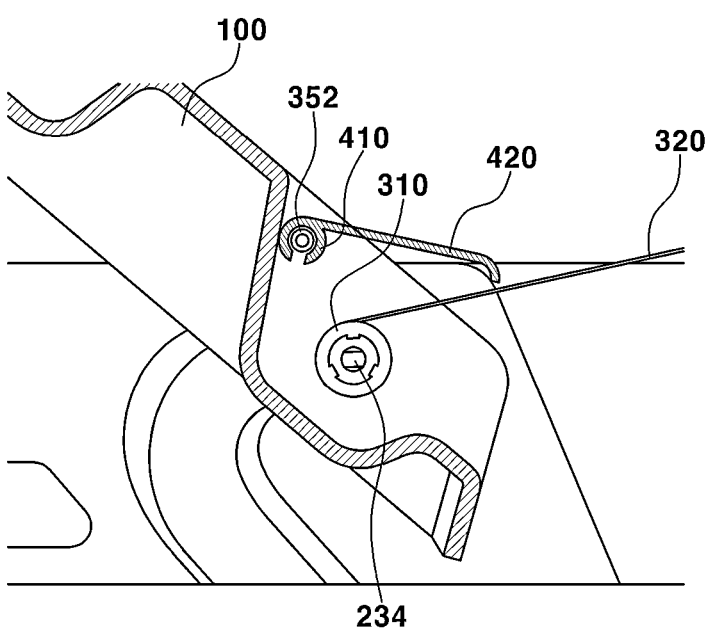

In addition, FIGS. 14A and 14B are views each showing a state in which the screen part for the cover for a vehicle according to the embodiment of the present disclosure is mounted (e.g., hook-mounted). FIGS. 15A and 15B are views each showing the screen part for the cover for a vehicle according to the embodiment of the present disclosure withdrawn when the rear seat moves forward. FIGS. 16A and 16B are views each showing a cover part when a main body part for the cover for a vehicle according to the embodiment of the present disclosure is rotated.

In general, in the case of a hatchback-type vehicle such as a sports utility vehicle (SUV), a compact utility vehicle (CUV), or the like, a space in a longitudinal direction of a luggage space is so narrow that the normal screen withdrawal is not possible due to the layout of the luggage space. Furthermore, even when the normal screen withdrawal is possible, the section of the layout is around 100 mm, so the usability of the screen is poor, resulting in a state in which a cover is being provided for the luggage space.

However, in the case of a normal cover, it not only provides a shelf function but also provides convenience to users by providing a structure that is opened together with the tailgate by being interlocked with the tailgate when the tailgate is opened. However, recently, the rear seat in these types of vehicles is designed to slide and recline in order to improve marketability of the vehicles. As a result, a gap is generated between the cover and the rear seat that has been adjusted, so that the interior of the luggage space may be exposed to the outside.

Accordingly, as shown in FIGS. 1 and 2, the cover for a vehicle according to the present embodiment includes a main body part 100, a pair of side hinge parts 200, and a screen part 300, thereby solving the above problems.

The main body part 100 has a predetermined size and is provided to shield the luggage space of the vehicle. The main body part 100 not only performs a role of a shelf in a horizontal state but may also be opened together, by being interlocked through cables and the like, with the tailgate. This configuration offers users the convenience of use for the luggage space without requiring separate interference from a user to move the cover.

The pair of side hinge parts 200 are respectively coupled to opposite sides of the main body part 100. The pair of side hinges parts 200 are inserted into and coupled (e.g., shaft-coupled) to the mounting holes (not shown) of the side trim parts 2 provided in the luggage space, respectively. As a result, the main body part 100 may be rotatably mounted in the luggage space of the vehicle.

In addition, due to the main body part 100 being mounted in this way, the main body part 100 may be easily separated or detached from the luggage space together with the side hinge parts 200 and the screen part 300. Moreover, this mounting approach allows users to selectively mount the main body part 100 according to their requirements and preferences.

The side hinge parts 200 are respectively coupled to the opposite sides of the front of the main body part 100 facing the rear seat 1. The side hinge parts 200 are respectively coupled to the mounting holes (not shown) of the side trim parts 2 operating on shafts to enable rotation. As a result, this configuration allows the main body part 100 to be opened together by being interlocked with the tailgate as the tailgate is opened.

As shown in FIG. 3, each side hinge part 200 includes a hinge bracket 210, a case member 220, a side pin 230, and an elastic member 240.

The hinge bracket 210 is mounted on a corresponding one of the opposite sides of the main body part 100 and fixed through a method such as fusion. The hinge bracket 210 is provided with a rotational shaft 214 including a rubber member 212 that is inserted into and shaft-coupled to its respective mounting hole (not shown).

In addition, as shown in FIG. 4, the case member 220 is positioned inside the hinge bracket 210 in a state of having the side pin 230 and the elastic member 240 coupled thereto.

The case member 220 is provided with a locking protrusion 222 protruding toward an upper portion of the hinge bracket 210 so that rotation thereof in a direction in which the side pin 230 rotates is restricted.

In other words, even when the screen part 300 rotates for withdrawal, the case member 220 is positioned (e.g., hook-positioned) on the hinge bracket 210 by the locking protrusion 222 as shown in FIG. 5, so rotation thereof may be restricted.

In addition, the locking protrusion 222 protrudes by being deviated to the rear side with respect to the center of the case member 220. Thus, when the main body part 100 is opened together by being interlocked with the tailgate, the hinge bracket 210 coupled to the main body part 100 may be separately rotatable toward the front side using the case member 220 as a rotating shaft as shown in FIG. 6.

In other words, as described above, in order to allow the hinge bracket 210 to rotate separately, the hinge bracket 210 is provided with a coupling area A where the case member 220 is positioned. The coupling area A may be provided with a plurality of protruding members 216.

More specifically, in order for the hinge bracket 210 to rotate separately with the case member 220 as the rotating shaft, the size of the case member 220 should be smaller than that of the coupling area A. In this case, since clearance issues may occur, the size of the case member 220 is made smaller than that of the coupling area A. However, to counteract any resulting gaps, the protruding members 216 are installed on a top portion, a bottom portion, and an inside portion of the coupling area A, thereby allowing the occurrence of the clearance to be offset.

An outer surface of the protruding member 216, which is in contact with the case member 220 on the coupling area A, may be rounded. When the hinge bracket 210 rotates separately, a smoother rotation is possible while offsetting the occurrence of the clearance due to such a round shape (see FIG. 6).

On the other hand, as shown in FIG. 4, the side pin 230 is rotatably coupled to the case member 220, extends toward the screen part 300, and is connected to the screen part 300. As a result, the side pin 230 is provided to rotate together with the screen part 300 as the screen part 300 rotates in order to be drawn out.

As shown in FIG. 3, the side pin 230 includes a side holder 232 and a pin member 234.

The side holder 232 is inserted into the coupling hole H that is provided along an axial direction of the screen part 300 and coupled to the screen part 300 (see FIG. 7). Such a side holder 232 may be provided in a shape corresponding to an inner shape of the coupling hole H to be able to rotate together with the screen part 300 when the screen part 300 rotates.

The side holder 232 may be coupled to the case member 220 together with the side cover 233 so that the position of the elastic member 240 is allowed to be fixed inside the case member 220.

In addition, the pin member 234 is rotatably provided inside the case member 220 in forward and reverse directions to rotate together with the side holder 232 as the side holder 232 is rotated by the screen part 300 that is drawn out.

The pin member 234 is provided to have an elliptical cross-section rather than a circular one, which is to enable rotation of the pin member 234 that is accomplished by the rotation of the side holder 232. In other words, during the rotation of the side holder 232, the side holder 232 may transmit rotational force to an outer surface of the pin member 234 penetrating the inside thereof, thereby allowing the rotation to be accomplished together with the pin member 234.

The elastic member 240 is fixedly disposed inside the case member 220 and coupled to the side pin 230. More particularly, the elastic member 240 is coupled to an end portion of the pin member 234 and is provided to allow elastic force to act thereon when being wound as the pin member 234 rotates in one direction.

Furthermore, the elastic member 240 may be provided in a reel spring. Accordingly, when the pin member 234 rotates in one direction, an elastic force may act on the elastic member when being wound.

In other words, as shown in FIG. 8, when the rear seat 1 moves forward, and the screen part 300 mounted on the rear seat 1 is drawn out forward, the side holder 232 including the pin member 234 is also rotated in the pulled direction. Since the case member 220 is positioned by being caught on the hinge bracket 210 by the locking protrusion 222, as shown in FIG. 9, a rotational force is generated by the side holder 232. By the continuous rotation of the pin member 234 according to the rotational force, the elastic force acts on the elastic member 240 while being wound.

As a result, when the screen part 300 is drawn out forward, the screen part 300 maintains tension through the elastic force acting thereon by the elastic member 240 and may be positioned by hooking on the rear seat 1. As a result, the drawn out screen part 300 effectively conceals the luggage loaded in the luggage room in a space between the rear seat 1 and the main body part 100.

Conversely, as shown in FIG. 10, when the rear seat 1 is moved rearward, i.e., the screen part 300 is returned to an initial position thereof, the side holder 232 including the pin member 234 also rotates in a direction to be returned. As shown in FIG. 11, rotational force is generated by the side holder 232 rotating in an opposite direction to that at the time of being drawn out. By the rotation of the pin member 234, the elastic force is released while the elastic member 240 is unwound.

As a result, in the case of trying to restore the screen part 300, the screen part 300 is released or unhooked from the rear seat 1. The screen part 300 may then be returned to its initial position while the elastic force acting thereon is released by the elastic member 240. Consequently, a smooth return of the screen part 300 may be achieved.

On the other hand, when the screen part 300, which is connected to the side hinge unit 200 by being coupled to the side holder 232, is selectively drawn out to be positioned by hooking on the rear seat 1, the elastic force acts thereon in a direction to be drawn out by the elastic force provided from the side hinge part 200 (see FIG. 1).

As shown in FIG. 7, such a screen part 300 includes a mounting member 310, a screen member 320, and a hooking member 330.

The mounting member 310 is provided to have a length extending along a width direction of the main body part 100 and is coupled to the side holder 232 by having a coupling hole H.

The screen member 320 is provided by being wound on the mounting member 310.

The screen member 320 is drawn out to allow concealing to be accomplished when a gap occurs between the main body part 100 and the rear seat 1 due to the sliding or reclining of the rear seat 1. The screen member 320 is also provided to be selectively drawn out toward the rear seat 1 in a state of being wound on the mounting member 310.

In addition, the hooking member 330 is coupled to the screen member 320 and provided with a plurality of hooking rings 332 to be positioned by hooking on the rear seat 1.

The screen part 300 as described above may be provided to correspond to a divided structure of the rear seat 1 and be provided by being divided. Each divided portion or section thereof may be independently drawn out.

According to the divided structure, mounting members 310 and 310' may be provided and rotating caps 340 and 340', respectively, connecting the mounting members 310 and 310' are provided to have diameters different from each other (see FIG. 7). The rotating caps 340 and 340' are connected to each other in a state where the rotating cap 340' is inserted inside the rotating cap 340. As a result, the mounting members 310 and 310' may be allowed to be rotated independently of each other when the screen members, i.e., divided sections, 320 and 320' are drawn out.

As shown in FIGS. 1, 2, and 12, the cover apparatus for a vehicle according to the present embodiment includes a cover part 400. The cover part 400 is provided to cover a mounting area 100a of the main body part 100. The mounting area 100a is mounted with the screen part 300 including the side hinge parts 200 therein.

Such a cover part 400 includes a pair of coupling members 410 and an upper cover 420.

As shown in FIG. 7, the pair of coupling members 410 are respectively coupled to the pair of support brackets 350. The pair of support brackets 350 are respectively provided with through holes 350a through which opposite sides of the screen part 300 pass, respectively, and with mounting guides 352 protruding along a direction facing each other.

In other words, as shown in FIGS. 13A and 13B, the pair of coupling members 410 may be correspondingly coupled to the mounting guides 352, respectively, thereby being coupled to the screen part 300.

When the screen part 300 is the divided structure described above, the support bracket 350 may also be positioned in a central portion divided to allow the rotation caps 340 and 340' to pass through and is provided with mounting guides 352 protruding to opposite sides. The coupling members 410 for the divided screen part 300 may be respectively connected to the mounting guides 352.

As the mounting guides 352 and the coupling members 410 are respectively coupled to each other, the upper cover 420 is rotatably provided with the mounting guides 352 as rotating shafts, has a predetermined size, and is provided with an end portion that is facing forward and bent. As a result, the upper cover 420 is allowed to cover the mounting area 100a.

Along with this, the mounting guides 352 are each provided with a spring S on an outer circumferential surface thereof. The springs S are inserted into the coupling members 410, respectively, and are provided to allow an elastic force to act on the upper cover 420 in a direction toward the screen part 300. Therefore, the upper cover 420 may always cover the mounting area 100a when the screen part 300 is drawn out or the main body part 100 rotates.

As a first embodiment, as shown in FIG. 14A and in cross-section in FIG. 14B (A-A of FIG. 14A), as the screen part 300 is mounted on the rear seat 1 and the screen part 300 moves upward, the upper cover 420 is also rotated upward by the screen part 300. However, the elastic force generated by the springs S acts downward in a direction for returning to the initial position of the upper cover 420, so the bent end portion of the upper cover 420 may be seated on the screen part 300.

As a second embodiment, as shown in FIG. 15A and in cross-section in FIG. 15B (B-B of FIG. 15A), in a state where the screen part 300 is mounted on the rear seat 1 and the rear seat 1 moves forward, the screen part 300 that is drawn out moves downward. As a result, the elastic force generated by the springs S acts on the upper cover 420, prompting the upper cover 420 to rotated downward. The rotation then causes the bent end portion of the upper cover 420 to be seated on the screen part 300.

As a third embodiment, as shown in FIGS. 16A and 16B, in a state where the screen part 300 is mounted on the rear seat 1 and the main body part 100 is rotated by the opening of the tailgate, the upper cover 420 is rotated upward by the body portion 100. However, the elastic force generated by the springs S acts downward in a direction for returning the upper cover 420 to its initial position. Thus, the bent end portion of the upper cover 420 may be seated on the screen part 300.

Therefore, as in the first to third embodiments, in a state where the screen part 300 is positioned to be hooked on the rear seat 1 and the rear seat 1 undergoes a forward sliding movement or the main body part 100 rotates, the elastic force generated by the springs S returns the upper cover 420 to its initial position. As a result, foreign substances are prevented in advance from entering into the mounting area 100a.

The present disclosure provides a cover apparatus for a vehicle cargo space. The apparatus provides a function of being opened by being interlocked with a tailgate, functions as a shelf, and functions as a screen that is selectively drawn out by elasticity as a rear seat slides and reclines. The screen is configured to cover a space between a cover body and the rear seat. Accordingly, the present disclosure has an effect in that the apparatus is able to prevent foreign substances from entering the luggage area or cargo space and to provide a function of concealing luggage loaded in the luggage area or cargo space.

In addition, the present disclosure mounts an upper cover for shielding the screen assembly. An end portion of the upper cover is allowed to be elastically supported in a downward direction. This configuration advantageously always shields the screen assembly by the upper cover regardless of a direction in which the screen is drawn out due to sliding and reclining of the rear seat.

The present disclosure has been described above with reference to the embodiment(s) shown in the drawings. However, it should be understood that this is only illustrative, and those having ordinary skill in the art should appreciate that various modifications may be made from the embodiment(s) and that all or parts of the embodiment(s) may be configured in selective combinations. Therefore, the true technical scope of the present disclosure should be defined by the technical spirit of the appended claims.

What is claimed is:

1. A cover apparatus for a vehicle, the apparatus comprising:
   a main body part provided to shield a luggage space of the vehicle and connected to a tailgate;
   a pair of side hinge parts coupled to the main body part and, as the tailgate is opened, configured to guide the main body part to rotate in a direction in which the main body part and the tailgate are opened together by being interlocked with each other; and
   a screen part mounted on the pair of side hinge parts and configured to be selectively drawn out and to be hooked on a rear seat,
   wherein the screen part is configured so that an elastic force acts thereon in a direction to be drawn out, the elastic force provided by the pair of side hinge parts.

2. The apparatus of claim 1, wherein the pair of side hinge parts are coupled to mounting holes of side trim parts provided in the luggage space, respectively, whereby the main body part is rotatably mounted in the luggage space.

3. The apparatus of claim 2, wherein the main body part is detachable from the luggage space together with the pair of side hinge parts and the screen part.

4. The apparatus of claim 1, wherein each side hinge part of the pair of side hinge parts comprises:
   a hinge bracket mounted on a corresponding one of opposite sides of the main body part and rotatably coupled to the luggage space;
   a case member positioned inside the hinge bracket;
   a side pin rotatably coupled to the case member, extending toward the screen part, and configured to rotate together with the screen part as the screen part is drawn out; and
   an elastic member coupled to the side pin by being fixedly disposed inside the case member and provided so that an elastic force acts thereon as the side pin rotates.

5. The apparatus of claim 4, wherein the case member has a locking protrusion protruding toward an upper portion of the hinge bracket so that rotation thereof in a direction in which the side pin rotates is restricted.

6. The apparatus of claim 4, wherein the hinge bracket has a coupling area where the case member is positioned, and wherein the coupling area includes a plurality of protruding members protruding from a top portion, a bottom portion, and an inside portion thereof and in contact with the case member.

7. The apparatus of claim 6, wherein each of the protruding members is provided such that an outer surface in contact with the case member is rounded.

8. The apparatus of claim 4, wherein the elastic member has a spiral structure with one portion positioned in a center thereof fixed to the side pin and with an opposite portion fixed to an inner circumferential surface of the case member.

9. The apparatus of claim 4, wherein the side pin comprises:

a side holder inserted into a coupling hole in the screen part in an axial direction and coupled to the screen part; and a pin member configured to rotate together with the side holder as the side holder is rotated by the screen part.

10. The apparatus of claim 1, wherein the screen part comprises:

a mounting member having a length extending along a width direction of the main body part and coupled to the pair of side hinge parts;

a screen member configured to be selectively drawn out while rotating the mounting member; and a hooking member coupled to the screen member and having a plurality of hooks configured to hook on the rear seat.

11. The apparatus of claim 1, wherein the screen part is configured having divided sections corresponding to a divided structure of the rear seat.

12. The apparatus of claim 11, wherein each divided section of the screen part is configured to be independently drawn out.

13. The apparatus of claim 1, further comprising:

a cover part provided to cover a mounting area of the main body part, wherein the mounting area is mounted with the screen part including the pair of side hinge parts thereon.

14. The apparatus of claim 13, wherein the cover part comprises:

a pair of coupling members respectively coupled to a pair of support brackets, which are respectively provided with through holes through which opposite sides of the screen part pass, respectively and with mounting guides protruding along a direction facing each other; and an upper cover rotatably provided with the mounting guides as rotating shafts, as the mounting guides and the coupling members are respectively coupled to each other.

15. The apparatus of claim 14, wherein each the mounting guide is provided with a spring on an outer circumferential surface thereof, wherein the spring is inserted into a corresponding coupling member of the pair of coupling members, and wherein the spring is configured to allow an elastic force to act on the upper cover in a direction toward the screen part.

16. The apparatus of claim 1, wherein the pair of side hinge parts are coupled via shafts to mounting holes of side trim parts provided in the luggage space, respectively, whereby the main body part is rotatably mounted in the luggage space.

* * * * *